United States Patent

Reneerkens

[11] 4,033,644
[45] July 5, 1977

[54] METHOD FOR PRELOADING BEARING

[75] Inventor: Josef Reneerkens, Bensberg-Refarth, Germany

[73] Assignee: Ford Motor Company, Dearborn, Mich.

[22] Filed: July 19, 1976

[21] Appl. No.: 706,335

[30] Foreign Application Priority Data

July 19, 1975 Germany .......................... 2532370

[52] U.S. Cl. ............................ 308/207 A; 267/161
[51] Int. Cl.² ........................................ F16C 25/00
[58] Field of Search ....... 308/189 R, 189 A, 207 R, 308/207 A, 238; 267/161, 162, 615

[56] References Cited

UNITED STATES PATENTS

| 3,141,660 | 7/1964 | Clarke et al. | 267/615 X |
| 3,773,152 | 11/1973 | Sitton | 267/162 X |
| 3,804,562 | 4/1974 | Hansson | 308/189 A X |
| 3,905,661 | 9/1975 | Orr | 308/207 A |

Primary Examiner—Joseph F. Peters, Jr.
Assistant Examiner—Gene A. Church
Attorney, Agent, or Firm—Clifford L. Sadler; Keith L. Zerschling

[57] ABSTRACT

The present disclosure relates to a method and means for preloading bearings and more particularly the preloading of tapered roller bearings of the type used in the axle systems of motor vehicles. In accordance with the disclosure a pair of Belleville spring washers are positioned against one of the races of a tapered roller bearing and secured in position in a manner so that the springs exert the desired preload upon the bearing. A self curing synthetic plastic material is injected into the housing containing the spring washers so as to surround the washers whereby the preload on the bearing will be set and will not be altered by subsequent high bearing loads on the spring washers. The surrounding plastic material prevents significant subsequent compression of the spring washers beyond their initial compression.

8 Claims, 1 Drawing Figure

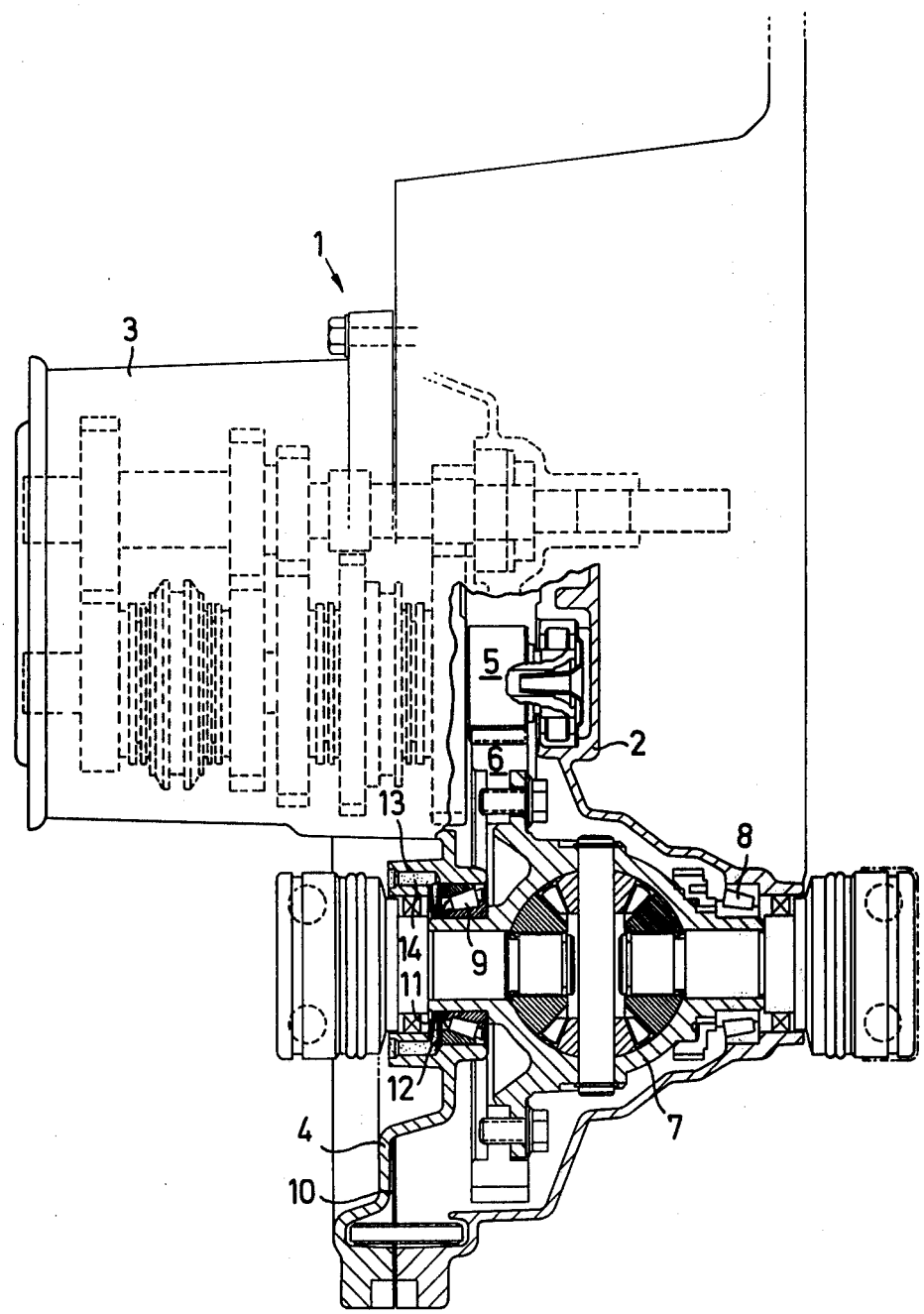

METHOD FOR PRELOADING BEARING

BACKGROUND OF THE DISCLOSURE

The present disclosure relates to a method of preloading bearings and more particularly to maintaining the correct preload upon tapered roller bearings such as used in the axle systems of motor vehicles. It is known in the art to use Belleville spring washers for preloading roller bearings. Normally a threaded device is used to adjust the preload. Examples of such prior art structures are shown in U.S. Pat. Nos. 2,656,734 and 3,905,661. The present invention provides an improvement in the use of spring washers to load roller bearings.

BRIEF DESCRIPTION OF THE DISCLOSURE

In accordance with the presently preferred embodiment of this disclosure, a shaft or rotatable member is rotatably supported in a housing by first and second tapered roller bearings. Each bearing has its inner race engaging the shaft by means of a press fit. The outer race of the first bearing engages a shoulder formed on the interior of the housing. The outer race of the second bearing has a clearance fit in a bore in the housing. A pair of Belleville spring washers surround the shaft adjacent to the second bearing and engage the outer race of the second bearing.

A closure member fits over the shaft and compresses the Belleville washers whereby a resilient force is exerted upon the outer race of the second bearing. The closure member is positioned to provide the desired level of spring deflection and, thus, the desired preload of the second bearing. Due to the construction involved, an equal preload is exerted on the first bearing, also.

After the preload of the bearings is established, a self curing synthetic plastic material is injected into the space between the two Belleville spring washers. The plastic material prevents compression of the washers beyond their preloaded condition. In the event a high axial load is imposed upon the second bearing, a subsequent change in the bearing preload will not occur.

BRIEF DESCRIPTION OF THE DRAWINGS

The many objects and advantages of a preloaded bearing construction in accordance with this disclosure will become apparent upon examination of the single drawing FIGURE when considered in conjunction with the following detailed description. The single drawing illustrates a vertical section through a drive unit belonging to a motor vehicle with a tapered roller bearing preload construction in accordance with the invention.

DETAILED DESCRIPTION OF PRESENTLY PREFERRED EMBODIMENT

The drawing illustrates a drive unit for a motor vehicle equipped with a transverse engine and front wheel drive. The drive unit comprises a gear box and axle drive unit complete with differential. The housing 1 for drive unit consists essentially of a coupling and axle drive unit housing 2 and a gear box housing 3. An extension 4 on the gear box housing 3 forms the cover for the axle drive housing 2.

The axle drive assembly essentially consists of a helical gear 5 on the output shaft of the gear box which meshes with a large helical gear 6 fixed to the rotatable differential housing 7. The differential housing 7, which contains differential and side gears of bevel gear design, is rotatably supported in the axle drive housing 2 and in the cover 4 by first and second tapered roller bearings 8 and 9.

During operation of the motor vehicle, the axial dynamic force exerted by the combination of helical gears 5 and 6 on the diferential 7 acts on the tapered roller bearing 8 and the bearing 9. The high axial dynamic load developed at full engine power, in one direction of rotation of the differential 7, is supported by the first tapered roller bearing 8 which reacts axially through a fixed shoulder of the housing 2.

During gear operation in the opposite direction, the axial force developed by the combination of the helical gears 5 and 6 on the differential housing 7 exerts a substantial load on the second tapered roller bearing 9. When negotiating steep inclines in reverse under full power, high axial dynamic loads will be applied to the tapered roller bearing 9.

During the preliminary assembly of the differential housing 7 and, in particular, when pressing the inner races of the tapered roller bearings 8 and 9 in position against their locating shoulders on the rotatable housing 7, cumulative axial tolerances are present which must be compensated for by the positioning of the outer race of the second tapered roller bearing 9. A further complication is introduced by the fact that the second roller bearing 9 is housed in the cover 4 (rather than in the housing 2) so that further axial tolerances are introduced as a consequence of the differing degrees of compression of the joint 10 where the housing portion 4 is joined to housing portion 2.

In one known method for adjusting the preload of tapered roller bearings in axle drive assemblies, a ring nut is provided in order to adjust the axial position of the outer race of the second bearing. In an alternate prior art construction, after appropriate measures are taken appropriately selected shims were fitted between the outer race of the second tapered roller bearing and the cover.

In accordance with the present disclosure economies and operating advantages are realized over known methods for adjusting tapered roller bearings. In accordance with the disclosure, after the installation of the previously assembled differential housing 7, the cover 4 is fitted in position with the Belleville spring washers 11 and 12 against the outer race of the second tapered roller bearing 9 slidably supported in the bore of the housing portion 4 which is then tightened down on to the housing portion 2.

The Belleville springs washers 11 and 12 are so disposed that the internal edges of the washers are in abutting engagement with one another while their outer edges are spaced apart. The outer edge of Belleville spring washer 12 engages the outer race of the tapered roller bearing 9 (which is installed with a clearance fit in the bore of the cover 4). The outer edge of the Belleville spring washer 11 engages an adjacent portion of the cover 4. The spring rates of the two spring washers 11 and 12 are so designed that at a predetermined axial installation load produced by tightening the cover 4 down onto the axle drive housing 2, the washers 11 and 12 cause the outer race of the bearing 9 to move by an amount corresponding to the cumulative axial tolerances and to provide the predetermined preload on the tapered roller bearings 8 and 9.

The bearing adjustment or bearing preload obtained in this fashion is adequate to cope with operation of the gears when the vehicle is moving forwardly. Under these conditions the first bearing 8 is loaded in compression and its outer race transfers the axial loads encountered to the shoulder in the housing 2. Under conditions of increased axial dynamic load of the kind encountered when negotiating steep inclines in reverse at full engine speed, the preload provided by the Belleville spring washers 11 and 12 may be exceeded. Accordingly, such axial dynamic loads might cause the deflection of the springs by an undesirable amount. In accordance with the preferred embodiment of the present invention, after the tightening down of the cover 4, a synthetic plastic material which is curable to form a relatively hard elastomeric mass is injected into the space between the two Belleville spring washers 11 and 12 through external access holes 13 in the cover 4. In this way, a two Belleville spring washers 11 and 12 are secured in the position in which they are prevented from significant compression. The spring washers 11 and 12 continue to exert an axial load on the outer race of the tapered bearing 9 but are prevented from collapsing when a contrary force is exerted on the washer 12 by the bearing 9 when that bearing is under a high axial compression load.

Installation of the spring washers 11 and 12, securing the cover 4, and injection of the synthetic plastic material 14 provides the means for compensating for cumulative axial tolerances and providing a bearing preload that corresponds to the spring rate of the two spring washers. Because the bearing preload developed by the spring washers 11 and 12 is normally no greater than the maximum axial dynamic loads expected to occur, the injection of the self curing synthetic plastic material into the space between the two spring washers of 11 and 12 assures that the bearing adjustment once made cannot subsequently be modified by the occurence of a higher axial dynamic load. The injected synthetic plastic material will preferably have hard elastic properties following setting and not adhere to the spring washers or to the housing so that due to its position between the two spring washers it prevents either of them from compressing any further under high axial dynamic loads while nevertheless assuring that the designed bearing preload is maintained when the tapered roller bearings wear. Although the two spring washers 11 and 12 are unable to compress further due to the plastic material injected therebetween, they still exert an axial adjustment force upon the outer race of the bearing 9.

In later operation, after wear occurs in the tapered roller bearings of a sufficient order to change the installed length of the bearing system comprising the two bearings 8 and 9, the desired bearing preload is maintained by the spring washers 11 and 12 which have a substantially constant spring rate. After wear has taken place, one of the spring washers will move away from the injected layer of plastic material 14 by a very slight amount to readjust for the wear. Upon a subsequent occurence of a high axial dynamic load on the bearing 9, the outer race of that bearing will move until the spring washers are once again solid against the plastic material 14. Under wear conditions the movement away from the material 14 is only nominal because the elastically preloaded housing and the elasticity of the injected material 14 has a compensating effect. Therefore, when a vehicle having a bearing construction in accordance with the present disclosure has been in operation for a substantial length of time and nominal bearing wear has taken place, the spring washers will assure that the requisite bearing preload is maintained.

The feasibility of the present invention was established by experimental constructions in which a room temperature self curing two part silicone rubber was injected between the two Belleville spring washers 11 and 12. In these experiments the material employed was manufactured by the firm of Bayer AG, Leverkusen, West Germany. The two ingredient materials were identified as Silopren RTV-AC 3004 and Silopren-Vernetzer-AC 3005 (as interlaying agent). The material in question is a two ingredient silicon rubber with crosslinking and vulcanizable at ambient temperatures.

This particular silicon rubber established the feasibility and soundness of the construction. This particular material, however, shrinks slightly upon curing and this can create paths for the escape of lubricating oil. If this particular material is used, means should be provided to prevent the escape of lubricant by means of appropriate seals. In the alternative, an injectable self curing elastomeric material which does not shrink may be used.

The foregoing description presents the presently preferred embodiment of this invention. Alterations and modifications may occur to those skilled in the art that will come within the scope and spirit of the following claims.

I claim:
1. A preloaded bearing construction comprising a housing, a member rotatable relative to said housing and a bearing interposed between said member and said housing;
   a spring engaging a portion of said bearing and exerting a preload force upon said bearing;
   an elastomeric plastic material disposed about a portion of said spring constructed to limit deflection of said spring in the direction opposite to the direction in which it exerts its preload force.
2. A means for adjusting and maintaining the preload on an anti-friction bearing comprising a housing member having an internal cavity, a rotatable member disposed within said cavity and an anti-friction bearing interposed between said housing member and said rotatable member;
   said bearing having an inner race in engagement with said rotatable member and an outer race in engagement with said housing member;
   one of said races being axially displaceable relative to the member which it engages;
   a spring means engaging said one race and exerting a preload force on said bearing;
   an elastomeric plastic material engaging said spring means and constructed to limit displacement of said spring means in the direction opposite to the direction in which it exerts its preload force.
3. A means for adjusting and maintaining the preload of an anti-friction bearing according to claim 2 and including:
   said spring means comprising a Belleville spring washer.
4. A means for adjusting and maintaining the preload of an anti-friction bearing according to claim 2 and including:
   said spring means comprising first and second Belleville spring washers.

5. A means for adjusting and maintaining the preload of an anti-friction bearing according to claim 2 and including:
said spring means comprising first and second Belleville spring washers;
said elastomeric plastic material being interposed between said first and second Belleville spring washers.

6. A means for adjusting and maintaining the preload on an anti-friction bearing comprising a housing having a bore, a rotatable member disposed within said bore and an anti-friction bearing interposed between said housing and said rotatable member;
said bearing having an inner race in press-fit engagement with said rotatable member and an outer race in axially slidable engagement with the wall of said bore;
first and second Belleville spring washers disposed adjacent said bearing;
the outer edge of said first washer engaging said outer race of said bearing;
a member secured to said housing engaging the outer edge of said second washer;
said pair of washers exerting a resilient force on said outer race of said bearing;
an elastomeric plastic material interposed between said first and second washers constructed to limit displacement of the outer edges of said washers toward each other.

7. A method of adjusting and maintaining the preload of an anti-friction bearing for a construction having a housing and a member rotatable within said housing;
said bearing having an inner race and an outer race;
positioning said bearing with said inner race in engagement with said rotatable member and said outer race in engagement with said housing;
positioning a spring adjacent said bearing;
securing a member to said housing causing said spring to exert a spring force upon said bearing;
injecting a curable plastic elastomeric material about a portion of said spring;
said material being constructed to limit displacement of said spring in a direction away from said bearing.

8. A method of adjusting and maintaining the preload of an anti-friction bearing for a construction having a housing and a member rotatable within said housing;
said bearing having an inner race and an outer race;
positioning said bearing with said inner race in press-fit engagement with said rotatable member and said outer race in slidable engagement with said housing;
positioning a pair of Belleville spring washers adjacent said bearing;
securing a member to said housing causing said spring washers to exert a spring force upon said outer race;
injecting a curable plastic elastomeric material between said spring washers;
said material being constructed to limit displacement of said washers toward each other.

* * * * *